US008037410B2

(12) United States Patent
Ramakrishnan et al.

(10) Patent No.: US 8,037,410 B2
(45) Date of Patent: Oct. 11, 2011

(54) METHOD AND APPARATUS FOR ESTIMATING THE SIZE OF RENDERED TEXT

(75) Inventors: Eyal Arasu Ramakrishnan, Santa Clara, CA (US); Jitendra Nath Pandey, Santa Clara, CA (US); Ilya Slain, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 387 days.

(21) Appl. No.: 12/259,170

(22) Filed: Oct. 27, 2008

(65) Prior Publication Data

US 2010/0107061 A1    Apr. 29, 2010

(51) Int. Cl.
*G06F 17/00* (2006.01)
(52) U.S. Cl. ...................................................... 715/256
(58) Field of Classification Search .................... 715/256
See application file for complete search history.

(56) References Cited

U.S. PATENT DOCUMENTS

| | | | | |
|---|---|---|---|---|
| 5,581,633 | A * | 12/1996 | Hotta et al. | 382/171 |
| 6,563,949 | B1 * | 5/2003 | Takebe | 382/190 |
| 7,409,635 | B2 * | 8/2008 | Epstein | 715/243 |
| 7,831,586 | B2 * | 11/2010 | Reitter et al. | 707/709 |
| 2006/0212801 | A1 * | 9/2006 | Berker et al. | 715/513 |

* cited by examiner

*Primary Examiner* — Doug Hutton, Jr.
*Assistant Examiner* — Shawn Joseph
(74) *Attorney, Agent, or Firm* — Hickman Palermo Truong & Becker LLP

(57) ABSTRACT

A method of fitting text comprising characters belonging to a character set into a text area wherein the text is rendered in a font and at a font size estimates a total width of the text based on at least a representative width associated with the character set, font and font size, identifies a horizontal truncation boundary based on at least the estimated width and the width of the text area, identifies a vertical truncation boundary based on at least the estimated width, text area, horizontal truncation boundary, and a representative height associated with the character set, font and font size, wraps the text at the horizontal truncation boundary, and truncates the text at the vertical truncation boundary.

8 Claims, 2 Drawing Sheets

METHOD AND APPARATUS FOR ESTIMATING THE SIZE OF RENDERED TEXT

BACKGROUND

1. Field of the Invention

Aspects of the present invention relate generally to calculating the rendered size of text to be displayed on a web page, and using the calculation to truncate the text as necessary.

2. Description of Related Art

For systems that have to dynamically generate content to be placed on a web page, and in a given, fixed block of space, it is important to be able to estimate the rendered size of the content at various text fonts and character sets. Conventionally, such estimates are informed by large databases that keep track of pixel sizes for a given character, font, and font size. Given their sizes, such databases can become infeasible to maintain and use.

Thus, it is desirable to both reduce the size of this type of database and increase its speed.

SUMMARY

In light of the foregoing, it is a general object of the present invention to provide a method and system for estimating the pixel space a given text will consume when it is rendered on a web page using a specified character set, font and font size.

BRIEF DESCRIPTION OF THE DRAWING FIGURES

DETAILED DESCRIPTION

Figure 1:
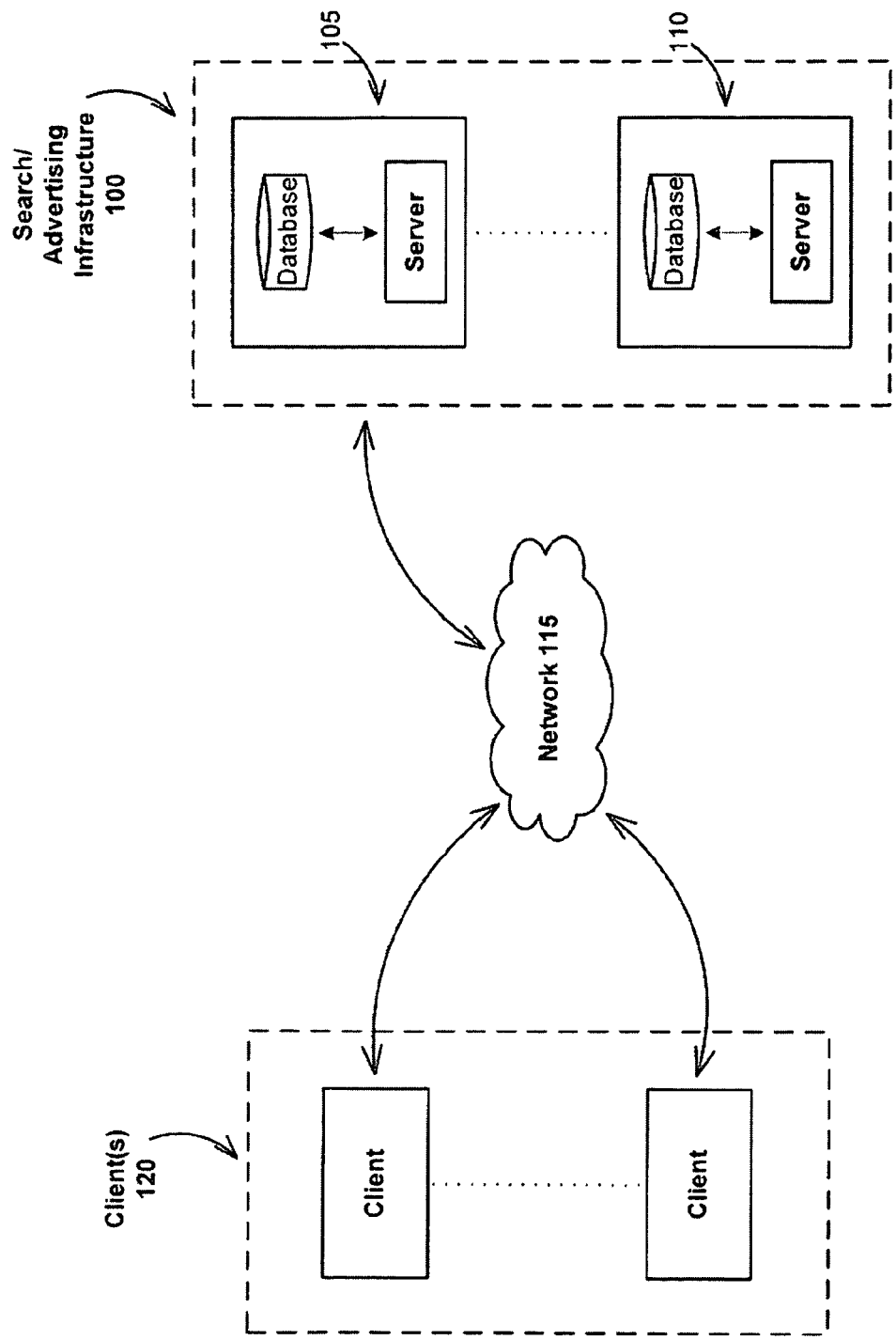
FIG. 1 is a functional block diagram of the general architecture of an exemplary embodiment of the present invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of estimating the rendered size of content on a web page; however, it will be appreciated that such invention could be practiced by any system requiring the dynamic placement of text within a known, bounded area.

Throughout this disclosure, reference is made to "system," which is used to denote an apparatus that generates content dynamically for placement on an external medium and in a given, fixed block of space. For example, consider a search/advertising infrastructure through which an Internet search engine operates (e.g., Yahoo!® Search, etc.). A search/advertising infrastructure may be tasked with various jobs, including, for example, placing text-based ads on a web page (e.g., web pages external to the search/advertising infrastructure which display ads provided by the search/advertising infrastructure, etc.), where those ads must be generated using a particular character set and within a certain bounded area.

FIG. 1 is a simplified block diagram illustrating how the invention may be employed in accordance with the detailed description, and in the specific context of dynamically placing text-based ads on a web page. Search/advertising infrastructure 100, as described above, may include any of a number of servers 105 and 110 (which optionally may include databases), etc. required for its operation; one or more servers 105 and 110 may be thought of as a "fitter" that fits text into an appropriate text area, and may implement the methods used to estimate the rendered size of content to be displayed on a web page, and to truncate the content when necessary, as described herein. Client(s) 120 may comprise a user at a computer carrying out typical web actions (e.g., browsing, searching, etc.). Search/advertising infrastructure 100 and Client(s) 120 are linked together through Network 115 (e.g., the Internet, etc.).

Systems which are required to generate dynamically content to be placed on external pages (e.g., web pages, etc.) are usually given a fixed amount of space within which to fit the content. In some instances, the to-be-displayed content cannot fit into the available space without modification. The content usually is modified by truncating it according to hard-coded boundaries, which can lead to inefficient use of space, and, depending on the character set, may not work at all. Regarding the inefficient use of space, consider a 100×10 pixel block of space meant to hold the following text advertisement: "Buy a new car!" If it is assumed that there is a hard-coded rule specifying that no more than 12 characters can be displayed for every 100 pixels (based on, for example, a guess that anything more than that will not fit), then the ad may be truncated to read as follows: "Buy a new . . . " (assuming also that the 10-pixel height is not enough to hold two lines of text, in which case it could not roll over to a second or third line). However, it may be the case that, depending on the font and font size, this ad could have fit into the allotted space without being truncated at all, but the hard-coded rule demands otherwise.

A known method for combating such limitations involves storing in a database the width and height (in, for example, pixels) of every character set at every font and font size. However, given the large number of available character sets and fonts to keep track of, the maintenance of such a database quickly can become infeasible. Moreover, real-time lookups in such a database may degrade the performance of the system more than is desired.

The storage and processing requirements described above can be collapsed substantially (even by orders of magnitude) by determining a "representative" width and height for every supported character set at every font and font size. The representative size (i.e., width and height) of a particular character set at a particular font and font size can then be used to estimate the size of the content to be rendered on the external page.

The representative size can be thought of as a working average across a particular character set at a particular font and font size. Determining the representative size can be tricky because characters in the character set have different sizes, and generally a few characters in the character set deviate wildly, in terms of size, from the other characters. The deviations skew a simple average. If a frequency plot is generated based on the size of all the characters in the character set, it typically looks like a bell-shaped curve.

Accordingly, instead of taking a simple average, the representative size should be made more robust by taking into account the characteristics just described. Specifically, the representative width may be determined as $M_w + 2S_w$, where $M_w$ is the mean pixel width across a particular character set at a particular font and font size, and $S_w$ is the standard deviation of the mean pixel width across the particular character set at the particular font and font size. A similar calculation is made with respect to pixel height (i.e., $M_h+2S_h$), and together the representative width and height comprise the representative size of the particular character set at the particular font and font size.

Figure 2:
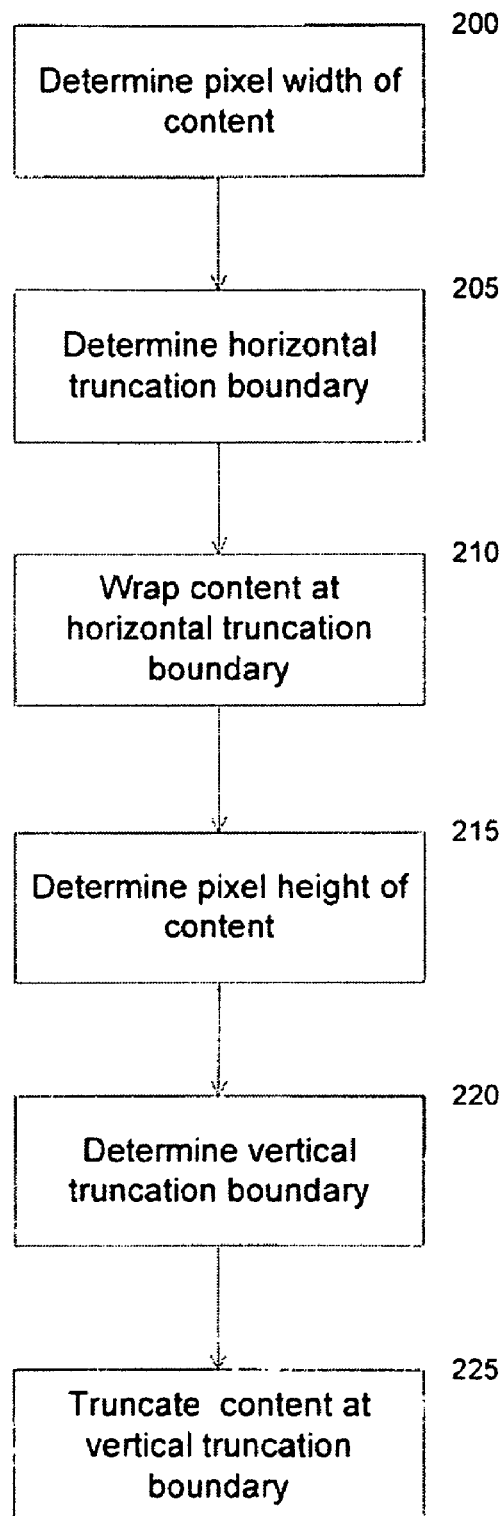
FIG. 2 is a logical flowchart of the general process by which content may be truncated based on a representative size.

FIG. 2 is a flowchart which illustrates generally a process of determining where to truncate the content based on the representative size. When the system receives a request for content, it may receive substantially concomitantly with that request the size of the space in which the content is to fit ("text area"). For example, a user requesting a web page may cause his browser to request from an advertising system an ad (the content) to be placed within a specified block of space (the text area). Such a request also may contain information about the desired character-encoding, language, font, font size, etc. of the ad. After receiving such constraints, at block 200 the system estimates the total pixel width of the content using the representative size, which size may be stored in, and retrieved from say, a database. The estimation of the total pixel width may be obtained by multiplying the number of characters in the content by the representative width associated with the particular character set, font and font size.

At block 205, an appropriate horizontal truncation boundary is determined based on at least the estimated pixel width of the content and the pixel width of the text area, and then the content is wrapped at the horizontal truncation boundary, as shown at block 210. At block 215, the system estimates the total pixel height of the content. The estimation of the total pixel height may be obtained, for example, by multiplying the number of rows—based on at least the estimated pixel width of the content and the determined horizontal truncation boundary—by the representative height of the particular character set, font and font size.

At block 220, an appropriate vertical truncation boundary is determined based on a least the estimated pixel height of the content and the pixel height of the text area, and then the content is truncated at the vertical truncation boundary, as shown at block 225.

The sequence and numbering of blocks depicted in FIG. 2 is not intended to imply an order of operations to the exclusion of other possibilities. Those of skill in the art will appreciate that the foregoing systems and methods are susceptible of various modifications and alterations. For example, blocks 210-225 may not be reached because the content will fit on a single line of the text area (i.e., it does not need to be wrapped or truncated).

Those of skill in the art also will appreciate that the methods described herein may be performed on a computer which executes instructions stored on a computer-readable medium. The medium may comprise a variety of volatile and non-volatile storage devices, systems, or elements, including but not limited to solid-state memory, fixed media devices, and removable media which may be used in computers having removable media devices.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of determining a representative height and width of a character set at a certain font and font size, said method comprising:
    calculating, over the character set, a mean width and a mean height of the character set;
    calculating, over the character set, the standard deviation of the width and the standard deviation of the height of the character set;
    for the representative height, combining the mean height and the standard deviation of the height;
    for the representative width, combining the mean width and the standard deviation of the width;
    storing the representative height and width together with the font, font size, and an identifier associated with the character set; and
    estimating, based on the representative height and width, an area a certain text, comprising characters belonging to the character set, will consume;
    wherein the method is performed by one or more computing devices.

2. The method of claim 1 wherein said combining for the representative width comprises adding the mean width to twice the standard deviation of the width; and
    said combining for the representative height comprises adding the mean height to twice the standard deviation of the height.

3. The method of claim 1 wherein the representative height and width are measured in pixels.

4. The method of claim 1, further comprising:
    determining a separate representative width and height for each particular font size of multiple different font sizes of said font having said font identifier.

5. A non-transitory computer-readable medium encoded with a set of instructions which, when performed by a computer, perform a method of determining a representative height and width of a character set at a certain font and font size, said method comprising:
    calculating, over the character set, a mean width and a mean height of the character set;
    calculating, over the character set, the standard deviation of the width and the standard deviation of the height of the character set;
    for the representative height, combining the mean height and the standard deviation of the height;
    for the representative width, combining the mean width and the standard deviation of the width;
    storing the representative height and width together with the font, font size, and an identifier associated with the character set; and
    estimating, based on the representative height and width, an area a certain text, comprising characters belonging to the character set, will consume.

6. The computer-readable medium of claim 5 wherein said combining for the representative width comprises adding the mean width to twice the standard deviation of the width; and
    said combining for the representative height comprises adding the mean height to twice the standard deviation of the height.

7. The computer-readable medium of claim 5 wherein the representative height and width are measured in pixels.

8. The computer-readable medium of claim 5, said method further comprising:
    determining a separate representative width and height for each particular font size of multiple different font sizes of said font having said font identifier.

* * * * *